United States Patent Office 3,086,888

Patented Apr. 23, 1963

3,086,888

COMPOSITION, AND METHOD FOR INSULATING ELECTRICAL CONDUCTORS, AND COATED ELECTRICAL CONDUCTORS

Robert L. Stratton, Folcroft, and David H. Reighter, Roslyn, Pa., assignors to I-T-E Circuit Breaker Company, Philadelphia, Pa., a corporation of Pennsylvania No Drawing. Filed Mar. 27, 1961, Ser. No. 98,330
9 Claims. (Cl. 117—212)

This invention relates to a novel composition and method for insulating electrical conductors. More specifically, it relates to a composition and method which is particularly suitable for insulating electrical conductors by dipping processes in a manner which will meet exacting requirements as to their physical and electrical properties.

In the preparation of insulated conductors, such as bus bars, certain properties are essential. The insulation must be sufficient to withstand operating voltages, must be readily adherent to the conductor and must have sufficient mechanical and chemical properties so that it will not deteriorate with repeated use under normal or adverse operating conditions. Moreover, it has always been desirable to attempt to employ an insulating composition which can be readily and economically applied to the conductor.

In the case of bus bars to be used in connection with switchgear equipment under high voltage conditions, it is also necessary that the insulation be flame retardant so that it can readily withstand conditions which may arise in the event of an overload or short circuit.

In this connection, certain standards for such equipment have been established by the industry through NEMA (National Electrical Manufacturers Association).

While epoxy resins are well known for their excellent insulating qualities and their ability to provide an insulation having the requisite electrical and mechanical properties required for insulation at high voltages, epoxies have heretofore been applied to electrical equipment by molding, casting or spraying methods. These techniques have inherent limitations. For example, molding or casting requires considerable tooling, and spraying is limited to techniques that can be obtained without multiple passes.

While dipping might appear to be a more economical process for applying an epoxy insulating composition, such techniques have not heretofore proven satisfactory because a liquid epoxy will not adhere to a metallic embodiment in an appreciable thickness.

In accordance with the present invention, a composition has been provided which can be readily used to insulate a metallic embedment such as a bus bar and which utilizes the inherent insulating properties of epoxy resins. Dip coating in this case is made possible by the use of a particular formulation hereinafter set forth in more detail, which includes the addition of a small amount of polyvinyl halide such as an electrical grade polyvinyl chloride plastisol.

While polyvinyl chloride plastisol has been known to have good dipping qualities by itself, it does not, by itself, have the necessary heat resistant qualities which are necessary in the manufacture and use of electrical equipment such as insulated bus bars.

In the present formulation, a polyvinyl halide is used in combination with a variety of epoxy resins and antimony-trioxide such that the resulting composition provides a composition containing an epoxy which can be readily applied to a metallic member or embedment by simple dip coating techniques. The polyvinyl chloride plastisol is added to the epoxy formulation in specified percentages which enables the mixture to have the necessary plastisol filming properties so that the formulation will adhere to the metal until cross linking takes place.

In using the present formulation, the desired properties of flame retardancy, thermal compatibility and semi-flexibility are imparted to the insulation.

Moreover, the present invention provides a composition and method for insulating electrical conductors which will satisfy industrial standards as to the insulating and flame retardancy properties of such insulation. The insulating composition herein described also will exhibit high impact strength, hardness, flexural strength, thermal compatibility with the metallic embedments, having a high heat distortion value and still maintain te necessary dielectric and mechanical strength which is necessary in the normal operation of conductor elements such as bus bars.

These and other advantages will become more apparent from the detailed description which follows.

The present invention contemplates the application of a novel epoxy resin formulation having highly desirable electrical, mechanical and chemical properties to a conductive metallic support. The epoxy resins herein contemplated are resins which are well known to the art and which comprise a polyether derivative of a polyhydric organic compound containing epoxy groups.

Such resins are typically the condensation products of an epihalohydrin such as epichlorohydrin and a polyhydric phenol such as bisphenol A. Examples of resins of this type are set forth in U.S. Patents Nos. 2,324,483 and 2,444,333.

As hereinafter will become apparent, these resins of this type may be modified to impart various properties as in examples of such modified resins which are herein set forth in more detail.

The particular formulation which is to be employed in the present invention contains the following ingredients: (1) a chlorinated epoxy resin, (2) a rigid epoxy resin, (3) a flexible epoxy resin, (4) antimony trioxide, (5) a filler, and (6) a polyvinyl halide plastisol. Moreover, the formulation will also contain known hardeners and catalysts to assist in the proper curing of the resin composition.

While it has been known to insulate electrical conductors with epoxy resin formulations, such formulations in order to meet NEMA standards for flame retardancy, would necessarily contain a large proportion of a relatively expensive halogenated epoxy resin. In the present formulation, the amount of such halogenated resin which is required is greatly reduced through the use of antimony trioxide and a combination of epoxy resins in the proportions hereinafter indicated. Through the use of such a formulation, the insulator member may be readily coated by economical dipping methods, and the resin thereafter cured to form an insulating body which is not only flame retardant, but which resists thermal and mechanical shock, is readily machinable, and will withstand chemical attack, and be unaffected by high humidity conditions to which such conductors are often exposed.

The halogenated epoxy resin employed in the present invention is typically a chlorinated epoxy such as the diglycidyl ether of tetrachlorobisphenol A which is sold under the trademark "Epi-Rez 5161" by Jones-Dabney Division of Devoe & Raynolds Company. A corresponding brominated resin, also suitable, is sold by this manufacturer under the name "Epi-Rez 5163."

The rigid epoxy resin herein contemplated is not halogenated. It is the diglycidyl ether of bisphenol A. These epoxies, in their uncured state, will be a clear, light colored liquid having a viscosity in the range of about 5,000 to 16,000 cps.@ 25° C. They will have an epoxide equivalent of 175 to 210 and a typical average molecular weight of 350 to 400. They may be cured at ambient or elevated temperatures to an infusible solid, and are known to have casting and potting applications. As stated above, they are not halogenated, generally containing less than 0.1% hydrolyzable chlorine. Suitable epoxies are sold commercially under the names "Epi-Rez 510" by Devoe & Raynolds Co., "Ciba 6010" by Ciba Co. or "Shell No. 828" by Shell Chemical Corporation. The rigid epoxy imparts desirable heat distortion properties to the final formulation, and at the same time, is a less expensive component than the chlorinated epoxy.

The flexible epoxy is a low viscosity (400–650 cps.) epoxy resin which imparts the property of improved flexibility, thermal shock, and low moisture adsorption, to the cured composition. Such a resin is sold under the trademark "Epi-Rez No. 507" by Devoe & Raynolds Co. This commercially available epoxy resin is the condensation product of a diglycidyl ether and ethylene glycol, having a viscosity of 550 cps. at 25° C., an epoxide equivalent of 385 and less than 0.15% hydrolyzable chlorine.

In an epoxy formulation containing 100 parts by weight, the proportion of each of the three types of epoxy resins would be in the range of 15 to 30 percent chlorinated epoxy, up to 35 percent rigid epoxy, and 15 to 45 percent of flexible epoxy resin.

Added to 100 parts of the combined epoxy formulation is antimony trioxide in an amount ranging from 20 to 40 parts per 100 parts of the combined epoxies. This amount of antimony trioxide is much greater than the amount sometimes used to impart stiffness to an epoxy formulation. The addition of substantial amounts of antimony trioxide makes it possible to provide the necessary insulation coating without resorting exclusively to a halogenated epoxy, and also makes it possible to mix with a halogenated epoxy a rigid and a flexible epoxy which would not only be less expensive than the halogenated material, but which can be used to impart the other desirable properties to the final insulation. While we do not wish to be bound by any particular theory, it is believed that the antimony trioxide reacts with the chlorinated epoxy to form an antimony oxychloride compound which enhances the flame retardant properties of the final composition.

The use of a polyvinyl halide plastisol such as polyvinyl chloride plastisol provides a carrier for the combination of epoxies which makes it possible to coat the conductor by a relatively simple dipping method. The polyvinyl chloride plastisol will be used in an amount which will give the desired holding power to the uncured mixture and typically would be used in the range 100 to 200 parts by weight per 100 parts of the combined epoxy resin. Most commonly, polyvinyl chloride plastisol would be used as the carrier, although it is understood that other vinyl monomers which will polymerize to vinyl resins may also be used. Thus, a plastisol formulated of copolymers of vinyl chloride and vinylidine chloride as well as copolymers of vinyl chloride with copolymerizable esters such as methyl- and ethyl-methacrylate are also contemplated, as well as the copolymers of vinyl chloride and a vinyl ester of a lower saturated aliphatic monocarboxylic acid, e.g. vinyl formate or vinyl acetate. The known plasticizers such as the di(2-ethylalkyl) phthalates may be used in the plastisol.

Combined with the above ingredients are suitable quantities of inorganic fillers which are well known to the art, and which would typically be finely divided silica flour (200 mesh or finer), barytes, aluminum oxide, calcium carbonate, or other known inorganic materials which are used in epoxy formulations. The filler may be employed in an amount up to 200 parts by weight based on 100 parts of total epoxy content, so long as it does not interfere with the dipping or deaeration qualities of the liquid formulation.

If faster curing is desired, there is also added to the formulation an epoxy curing catalyst such as tris (dimethyl amino methyl) phenol. Known liquid anhydride hardeners are also used in conjunction with the epoxy resins. Such anhydride hardeners would typically include phthalic anhydride, methyl Nadic anhydride, (4-endomethylene tetrahydrophthalic anhydride), dodecenyl succinic anhydride, hexahydrophthalic anhydride and eutectic mixtures of hexahydrophthalic anhydride and tetrahydrophthalic anhydride.

In the method for insulating a conductor in accordance with the present invention, the conductor first has its surface cleaned by sandblasting or other suitable mechanical abrasion. The metallic conductor, which may be of copper, aluminum or other metal or alloy, is then heated to about 250 to 450° F. and dipped in the liquid resin formulation with a slight oscillatory downward movement, and slowly enough to produce a minimum amount of air entrapment. The metallic embedment is then held beneath the surface of the formula for sufficient time to produce the desired insulation thickness. Typically, a 45 second dip produces a coating approximately .15 inch thick. The assembly may be reheated and additional thicknesses applied until the total desired thickness is obtained. The curing times and temperature will vary with the type hardener and catalyst used, but must at some time in the cycle reach and be held at the minimum temperature to secure cure of the plastisol component.

In an example of the instant formulation and the method of coating a conductor therewith, the following compositions and procedures were employed, and an epoxy formulation having the following ingredients was made up as follows:

| | Parts by weight |
|---|---|
| Chlorinated epoxy, "Epi-Rez" No. 5161 | 25 |
| Rigid epoxy, "Epi-Rez" No. 510 | 40 |
| Flexible epoxy, "Epi-Rez" No. 507 | 35 |
| Silica filler (200 mesh) | 170 |
| $Sb_2O_3$ | 30 |
| Catalyst, tris-(dimethylamine methyl)phenol | 2 |
| Methyl Nadic anhydride, hardener | 68 |
| Polyvinyl chloride plastisol (Metal & Thermit 4237-5 P.V.C. plastisol) | 150 |

A copper bus bar was then sandblasted, heated to 350° F. and dipped in the above formulation. During dipping the copper embedment was oscillated slowly, and after 45 seconds was removed with the coating .15 inch thick. The assembly was then reheated to 350° F. and dipped for another 45 seconds to produce another coating of equal thickness.

A further advantage in dip coating electrical conductors is apparent from the following: In the manufacture of bus bars, it has been the practice to silver-plate the surface where good conductivity is desired and where such conductivity might be adversely affected, as through atmospheric oxidation of an uncoated copper surface. Since the silver-plating and associated solutions will not affect the present epoxy resin polyvinyl chloride coating, the silver-plating can be performed after the application of insulation, and silver will adhere only to the uninsulated areas. Thus, there is no need to silver-plate the entire bus bar prior to the application of insulation, as was done in the prior art.

With the present dip coating method, contact areas can easily be masked off prior to dipping. The masked areas can then be plated, thereby eliminating the necessity and expense of plating the entire bus bar. Alternatively, the entire bar can be dip-coated and the coating cut off, while at maximum cure temperature, in the areas in which no insulation is to be applied. The present invention, therefore, is effectively utilized in encapsulating odd shaped and figures and can eliminate the taping of joints and bends necessary when following prior art methods.

Although this invention has been described with respect to its preferred embodiments it should be understood that many variations and modifications will now be obvious to those skilled in the art, such as its application to the insulation of non-current carrying members such as barriers and shields. It is preferred, therefore, that the scope of this invention be limited not by the specific disclosure herein but only by the appended claims.

What is claimed is:

1. The method for insulating a metallic embedment comprising heating the embedment, dipping the same in a liquid resin formulation containing a halogenated epoxy, an epoxy which is rigid when cured and an epoxy which is flexible when cured combined with antimony trioxide and a polyvinyl halide plastisol, removing the coated conductor from the liquid dip and curing the epoxy-containing coating so as to form an insulation layer on the metallic conductor.

2. The method for insulating a metallic electrical conductor comprising masking the conductor in predetermined areas, heating the conductor, dipping the same in a liquid resin formulation containing a halogenated epoxy, an epoxy which is rigid when cured, an epoxy which is flexible when cured, antimony trioxide and a polyvinyl chloride plastisol, removing the thus coated conductor from the liquid dip and curing the epoxy-containing coating so as to form an insulating layer in said predetermined areas of the metallic conductor and subsequently silver-plating said conductor in the areas not coated with said insulating layer.

3. The method of claim 2 in which the metallic conductor is heated to a temperature between 250 and 450° F. prior to dipping in the liquid resin formulation.

4. The method of claim 2 in which the surface of the metallic conductor is mechanically abraded prior to dipping in the liquid resin formulation.

5. A liquid composition for insulating metallic electrical conductors comprising a halogenated epoxy resin, an epoxy resin which is rigid when cured, an epoxy resin which is flexible when cured, antimony trioxide, a filler and a polvinyl halide plastisol.

6. A liquid composition for insulating metallic electrical conductors comprising 100 parts by weight of an epoxy resin which contains 15 to 30 percent of a chlorinated epoxy, up to 35 percent of an epoxy which is rigid when cured and 15 to 45 percent of an epoxy which is flexible when cured, and combined therewith, 20 to 40 parts of antimony trioxide and 100 to 200 parts of a polyvinyl halide plastisol.

7. The composition of claim 6 having included therewith up to 200 parts by weight of a finely divided filler.

8. An electrically conductive bus bar having coated thereon an epoxy resin insulation comprising 100 parts by weight of an epoxy resin which contains 15 to 30 percent of a chlorinated epoxy, up to 35 percent of a rigid epoxy and 15 to 45 percent of a flexible epoxy, and combined therewith 20 to 40 parts of antimony trioxide and 100 to 200 parts of a polyvinyl halide.

9. An electrically conductive bus bar having coated thereon in predetermined areas an epoxy resin insulation comprising 100 parts by weight of an epoxy resin which contains 15 to 30 percent of a chlorinated epoxy, up to 35 percent of a rigid epoxy, and 15 to 45 percent of a flexible epoxy, and combined therewith, 20 to 40 parts of antimony trioxide and 100 to 200 parts of a polyvinyl halide pastisol, and having in the non-insulated areas thereof a coating of a silver paint.

References Cited in the file of this patent

UNITED STATES PATENTS

| | | |
|---|---|---|
| 2,512,996 | Bixler | June 27, 1950 |
| 2,550,232 | Donnell et al. | Apr. 24, 1951 |
| 2,717,216 | Arone | Sept. 6, 1955 |
| 2,836,319 | Pinsky et al. | May 27, 1958 |
| 2,951,778 | Haberlin | Sept. 6, 1960 |

FOREIGN PATENTS

| | | |
|---|---|---|
| 190,604 | Austria | July 10, 1957 |